United States Patent

Groezinger

[15] 3,678,271
[45] July 18, 1972

[54] MARKING AND DETECTION OF SUBSURFACE DEFECTS IN MULTI-LAYER HOSE STRUCTURES

[72] Inventor: John J. Groezinger, Peoria, Ill.

[73] Assignee: Caterpillar Tractor Co., Peoria, Ill.

[22] Filed: Oct. 9, 1969

[21] Appl. No.: 865,020

[52] U.S. Cl. ................................. 250/71.5 R, 250/106 T
[51] Int. Cl. ............................................................ G01t 1/20
[58] Field of Search .................. 250/106 T, 106 SC, 83.3 IR, 250/83.6 FT, 71.5

[56] References Cited

UNITED STATES PATENTS

| | | | |
|---|---|---|---|
| 2,856,539 | 10/1958 | Orthuber et al. | 250/83.3 H |
| 3,092,723 | 6/1963 | Payne et al. | 250/106 SC X |
| 3,200,252 | 8/1965 | Moses et al. | 250/106 SC X |
| 3,303,419 | 2/1967 | Gith | 250/106 T X |

Primary Examiner—Archie R. Borchelt
Attorney—Fryer, Tjensvold, Feix, Phillips & Lempio

[57] ABSTRACT

Subsurface defects in multi-layer hose structures are marked as to location and extent with a tape having an axial stripe of radioactive salts thereon which is subsequently detected with scintillation counters that are connected to circuits and controls which mark or remove the faulty section of the hose structure after completion of the hose. The radioactivity of the salt is capable of being detected through the subsequent layers of the hose structure which cover the tape as the manufacture of the hose continues after the defect is coded with the tape.

7 Claims, 4 Drawing Figures

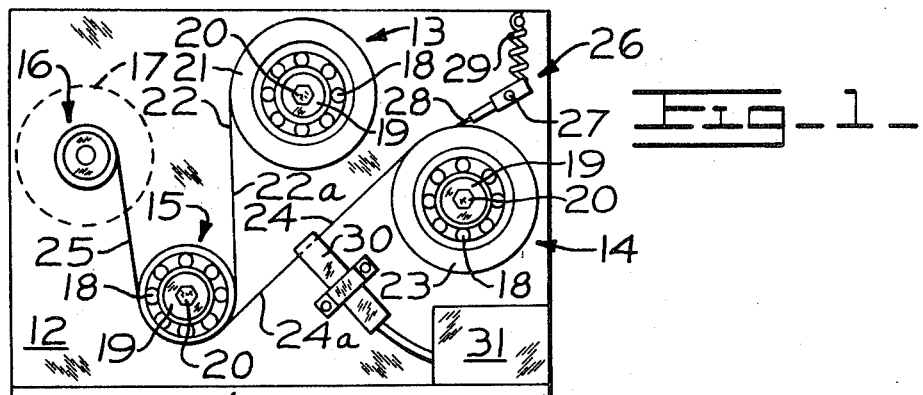
Fig-1-
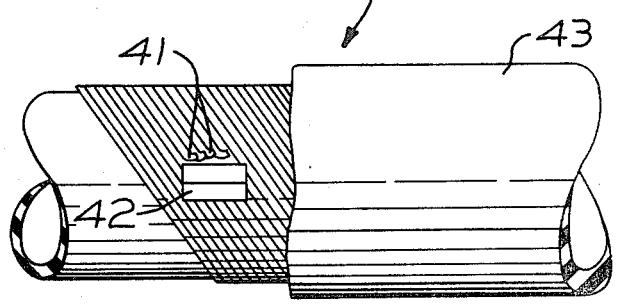
Fig-2-
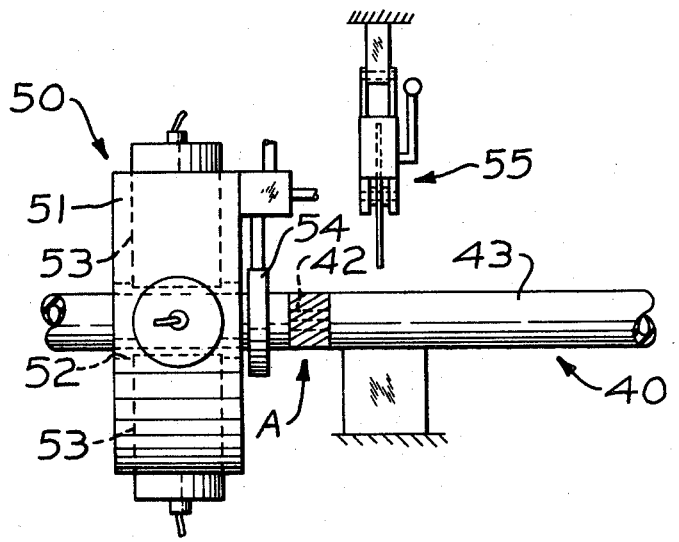
Fig-3-
INVENTOR
JOHN J. GROEZINGER
BY
Fryer, Tjensvold, Feix, Phillips & Lempio
ATTORNEYS

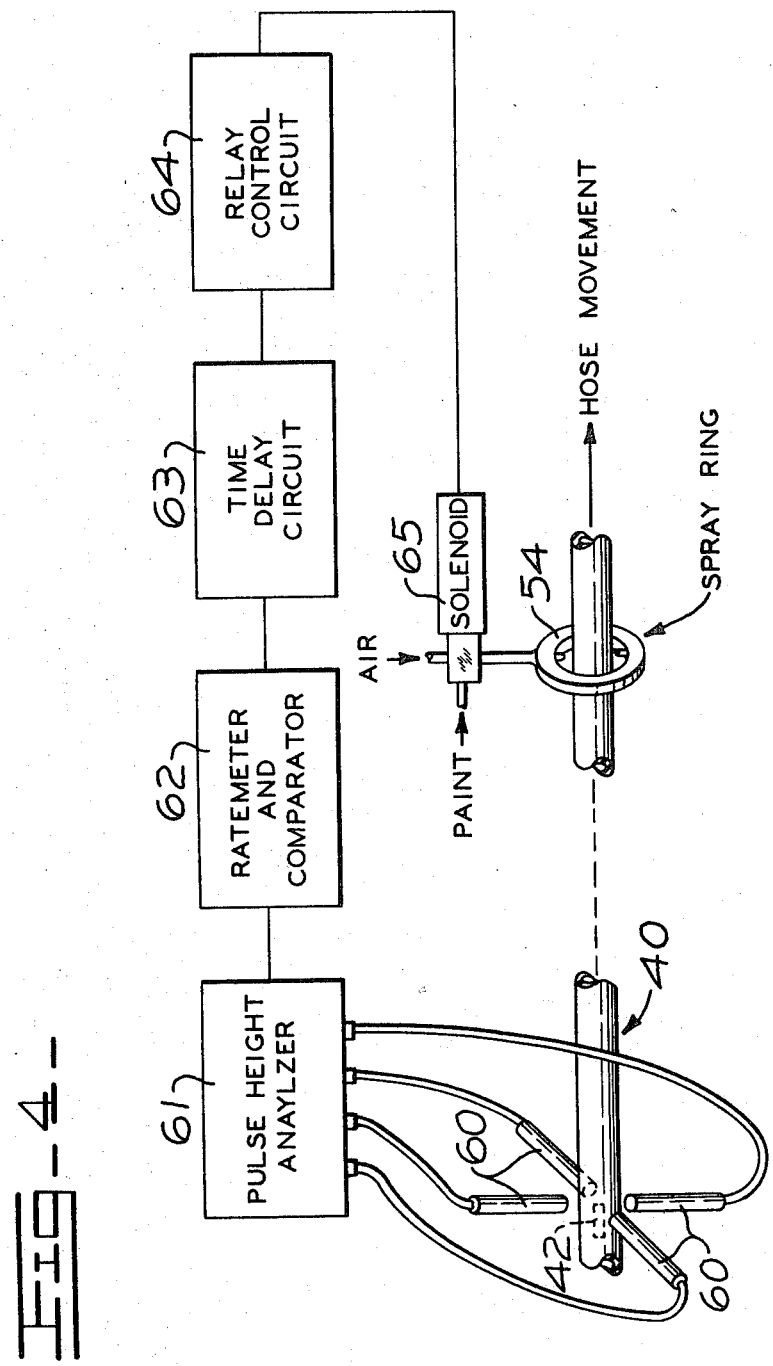

MARKING AND DETECTION OF SUBSURFACE DEFECTS IN MULTI-LAYER HOSE STRUCTURES

BACKGROUND OF THE INVENTION

In the manufacture of high-pressure hydraulic hose multiple and concentric layers of rubber, fabric and reinforcing are wrapped on a mandrel to build up the hose structure in stages. Usually the hose construction consists of the core of elastomer and fabric on which wire reinforcing is would in a helical or spiral manner, usually wound in an opposite direction in adjacent plies, which are normally separated by insulating layers of elastomer. Once the hose structure has been completed an outer elastomer casing or cover is applied and the hose is subsequently cured under heat pressure. Conventionally, shrink tape is wrapped around the outer casing for the curing step. Thereafter the mandrel is removed from the center of the hose and the hose is further processed into the hydraulic assemblies or designated lengths of hose. The manufacture of high-pressure hydraulic hose, such as referred to above, is disclosed and illustrated in the assignee's U. S. Pat. No. 3,357,456 issued to Grawey et al. and reference is made thereto for a more detailed description of the hose manufacturing process.

During the manufacture of the hose and the application of any of the several concentric layers or plies, a defect may occur in the manufacturing process which will be covered by the subsequent plies as they are applied. Conventionally, when such a defect occurs, the operator will measure the extent of the defect and also measures the distance of the defect from an end of the supporting mandrel. The mandrels, which can be up to 50 feet in length, are tagged and the mandrel tag, the defect in inches and its distance from the end of the mandrel are all entered into a log so that the defective section of the hose can be subsequently located and removed after the hose has been completed. It can be appreciated that upon completion of the hose it will be necessary to measure the hose to determine the location and the extent of the defect since no sign of the defect is visible on the surface of hose.

Using such a cumbersome log system, a number of errors are likely to occur. Obviously, there are errors in the measurement of the location of the defect from the end of the mandrel, inaccurate recording of these measurements, figure transpositions, etc., which often result in removing the good sections of the hose and allowing defective sections to pass on to further processing where the defects may or may not be found. This increases expense and decreases quality control. Of course, the additional man hours required to physically measure the length of hose at least twice along with the record keeping is likewise undesirable and costly.

The above log-record method has been conventionally employed in the manufacture of hydraulic hose since other techniques which destroy the concentricity of the hose structure are unsuitable for a variety of reasons. For example, any marker that destroys the concentricity of the hose can cause difficulty when additional layers or plies are added to the hose carcass during subsequent manufacturing operations. As a result, the log-record technique in the past has been the only suitable way to keep track of the subsurface defects which are covered by subsequent layers of the hose structure. Since the hose is made on mandrels, it is impossible to cut out defective portions of the hose as they occur since the manufacturing process is a continuous unit process as described in the aforementioned patent.

Thus, it is an object of the instant invention to provide an improved technique for marking and detection of subsurface defects in hydraulic hose both as to location and extent without changing its concentricity.

A further object of the invention is to provide a simple technique for marking and subsequent detection of subsurface defects which requires fewer man hours and that will substantially eliminate the human error factor in such operations.

A further object is the provision of an apparatus whereby detection and marking or removal of defective hose sections can be accomplished automatically.

A collateral object of the invention is the provision of a special adhesive tape consisting of two layers having a center stripe of radioactive salt sandwiched between the tape layers which can be employed to mark subsurface defects in hydraulic hose.

It is also an object of the current invention to provide suitable apparatus for detection and marking hose having subsurface defects, coded with the tape.

It is also an object of the invention to provide a double layered adhesive tape having a stripe of radioactive salts down its center line which is safe for manual handling so that operators of hose plants can employ it to mark subsurface defects during the manufacture of hose.

Other objects and advantages will be apparent from the description which follows.

SUMMARY OF THE INVENTION

A radioactive marking and tracing tape for marking subsurface defects in hose structures and the like includes a stripe of radioactive salts disposed along the center line of one layer of an adhesive faced tape and on a surface which is covered by a second layer of said tape encapsulating said stripe of radioactive salts in a sandwich tape laminate having at least one exposed adhesive face. This marking and tracing tape is attached to defective areas in hose structures and the like through its exposed adhesive face to mark the location and extent of subsurface defects (the length of tape being equal to the length of the defect) which are subsequently covered by additional layers of the fabricated structure. Detection of the tape and a marking of the outer surface of the finished structure is accomplished with scintillation detectors connected to circuits and controls to mark or remove portions of the finished structure corresponding to that marked with the length of said tape laminate. The scintillation detectors are connected to a pulse analyzer, comparator, time delay circuits and a marker or cutter to form the apparatus for automatically marking or removing defective sections of the fabricated structure.

BRIEF DESCRIPTION OF THE DRAWINGS

The current invention will be better understood by reference to the attached drawings in conjunction with the description herein.

FIG. 1 is an elevation of the machine for the manufacture of the laminated radioactive marking and tracing tape;

FIG. 2 shows an elevation with parts of the cover broken away exposing a subsurface defect in an inner layer or ply of reinforced hose tagged with the laminated radioactive marking and tracinG tape;

FIG. 3 illustrates a detection and marking system for employment in conjunction with the radioactive tape to band the outer surface hydraulic hose structures over subsurface defects along with a manual cut-off saw for removing the banded portions of the hose; and FIG. 4 is a schematic illustration of the circuitry for the system illustrated in FIG. 3.

BRIEF DESCRIPTION OF A PREFERRED EMBODIMENT

In the practice of the invention, it is necessary to prepare the laminated radioactive marking and tracing tape which is accomplished with a laminate forming machine 10, illustrated in FIG. 1. The machine includes a base 11 which supports a vertical plate 12 on which two tape bobbins 13 and 14 are mounted along with an idler roller and a power take-up reel 16 whose drive motor and reduction gearing 17 are illustrated by broken lines Each tape bobbin and the idler roller includes a roller bearing 18 mounted on a boss 19 which is secured to the face of the plate with a bolt 20.

Mounted on tape bobbin 13 is a roll 21 of adhesively faced tape whose free end 22 is threaded over the idler roller 15 to the take-up reel 16, as illustrated in FIG. 1. Similarly, another roll 23 of adhesively faced tape is mounted on bobbin 14 with its free end 24 threaded across the idler roller so that it is in registry with the free end of roll 21 whereby the adhesive face 22a of this latter roll will join the two tapes in a laminated two-ply tape 25 which is wound on the take-up reel. An adhesive face 24a of roll 23 will provide an adhesive surface by which the laminated tape can be attached to partially fabricated structures for marking and tracing defects which are subsequently covered by additional layers of the structure.

Mounted adjacent to roll 14 is a stylus 26 which is pivoted about pin 27 so its writing point 28 will track on the peripheral surface of this roll, as illustrated in FIG. 1. A biasing spring 29 is connected to the opposite end of the stylus and it urges the writing point into engagement with the roll surface insuring positive writing contact.

The stylus may consist of a fountain pen or similar writing device which has its writing point contacting the center line of the tape to write or print a stripe on the center line of roll 23 as it unwinds from its bobbin 14. The reservoir of the stylus is filled with an ink-like substance which includes a soluble salt of a radioactive salt having a short half life. For example, salts containing iodine-131, gold-198, or chromium-51 are suitable. A suitable concentration of the radioactive salt along the center line of the tape for marking and tracing defects in hydraulic hose should yield approximately 0.85 microcuries per inch but the linear specific activity can be adjusted, as a situation demands. All of the above salts have short half lives and this is desirable in order to reduce the problems involved in the disposal of the scrapped hose which has been marked with the tape and removed.

When the take-up reel 16 is winding the laminated marking and tracing tape, the stylus tape writes or prints a stripe in the center of the tape as it egresses from its roll 23 and this strip is monitored by a Geiger Mullar tube 30 as it progresses to the idler roller 15 which is connected to recording ratemeter 31 for making the appropriate reports to the AEC. Commercially available SCOTCH tape can be employed and either the single faced adhesive or double faced adhesive type is suitable. It may be desirable to use the double faced adhesive tape for roll 23 to insure the better bonded laminate tape.

It should be appreciated that the two layers of tape are brought together so the stripe of radioactive salts printed or written along the center line of the tape leaving roll 23 is sandwiched between the two layers. This encapsulaton reduces a likelihood that any of the radioactive salts will be inadvertently dispersed after the ink dries or during use of the resulting laminated tape. Further, it allows the laminated radioactive tape to be placed on a convention office tape dispenser and placed in the hose plant without danger to personnel, since ingestion or contact with the radioactive salt is almost precluded by the laminated sandwich arrangement.

In FIG. 2 a portion of hydraulic hose 40 is illustrated with parts broken away to show the employment of the radioactive marking and tracing tape. A series of broken wires 41 are illustrated in the hose structure and are marked with a piece of the laminated tape 42 having a radioactive stripe along the center line which tape is normally covered by the outer cover or casing 43 of the hose structure. It is to be noted that the length of tape is applied along the full length of the defect so that the axial stripe on the tape is coextensive with the defect. As a result the marking and tracing tape can accurately pinpoint both sides of the defect so that it may be ultimately removed without wasting additional portions of the hose structure.

After the defect has been marked with the tape, manufacture of the hydraulic hose is continued until the total manufacturing process has been completed and the mandrel has been removed from the hose core. At this point the hose is routed through a detection and marking unit 50 illustrated in FIG. 3. This unit consists of a thick circular lead shield 51 with the central aperture 52 wherein through which the completed hose structure is passed. Four bores extend from the surface of the lead shield to communicate with the aperture through which the hose passes. These bores are indicated by broken lines 53 and are located at right angles to one another. Mounted in each bore with appropriate shielding are sodium iodide scintillation detectors which will monitor the hose as it passes through the aperture. These detectors will, through the circuitry illustrated schematically in FIG. 4, operate a paint spray ring 54 mounted adjacent to the shield to spray a band A on the hYdraulic hose passing through the aperture which corresponds exactly to the subsurface position of tape strip 42. Subsequently, the hand-operated saw 55 can be employed to cut out the defective banded section of the hose.

Referring to FIG. 4 the sodium iodide scintillation detectors 60 are shown arranged about the hose structures without the circular lead shield and other shielding normally employed to lower background radioactive radiation. Each detector is connected to a pulse height analyzer 61. The pulse height analyzer discriminates to increase the signal-to-noise ratio and accepts radiation energy levels having the known energy of the radioactive salt employed in the stripe. The analyzer forwards resulting signals to a ratemeter and comparator 62. The ratemeter and comparator will provide an output signal directly related to the position of the tape relative to the four circularly arrayed detectors as the hose passes through their detection circle. In the ratemeter and comparator the count rate is averaged over a preset time constant and changes in the count rate caused by the presence of the tape strip 42 and the detection circle or field of the detectors 60 will cause the ratemeter and comparator to supply signal to the time delay circuits 63 whose output is connected to relay 64 that operates a solenoid 65. This solenoid is connected to control the air flow to a spray ring 54 which sprays a band of paint about the circumference of the hose as it passes through the spray ring. The band corresponds exactly to the position of the underlying laminated tape in the subsurface portions of the hydraulic hose structure.

Using the above parameters the hydraulic hose can be moved through the detection circle of the circular array of scintillation detectors 60 at a rate of approximately 38 feet per minute and the time delay circuits are adjusted to compensate for the distance between the detection circle and the spray ring and the relative movement of the hose through the detection and marking system 50.

The above circuit components are fairly conventional and can be obtained from various sources for forming the combined circuit described above.

I claim:

1. A self-sticking marking and tracing tape for marking subsurface defects in multi-layer hose structures and the like comprising two layers of adhesive faced tape assembled in registry to form a laminate through utilization of one of said adhesive faces, one of said tape layers having a continuous stripe of radioactive salts of uniform radioactivity along its length disposed on its surface which is contiguous to the other tape layer in said laminate, said stripe centrally disposed wherein said stripe of said radioactive salts is encapsulated between said two layers, said laminate having at least one adhesive face.

2. The marking and tracing tape as defined in claim 1 wherein the half life of the radioactive salts in the stripe is less than 60 days.

3. A method of tagging subsurface defects as to location and extent in multi-layer hose structures and the like which are covered over by subsequent layers of the structure comprising:

placing a strip of a self sticking two layer laminated tape having a continuous stripe of radioactive salts of uniform radioactivity along its length disposed on its center line along said defect at the time it occurs, said strip having a length substantially coextensive with the length of said defect;

subsequently detecting the location of said tape by its radioactive emissions coming through overlying layers of the structure when the structure has been completed; and indexing the outer surface of said structure to correspond with underlying position of said strip of tape by detection of the beginning and end positions of said stripe of radioactive salt.

4. The method defined in claim 3 wherein the indexing is accomplished by applying a visual mark co-extensive with the stripe to the outer surface of the structure.

5. The method defined in claim 4 wherein the visual mark is paint sprayed on the exterior surface of the structure.

6. The method defined in claim 3 wherein the indexing is accomplished by removing the portion of the structure containing the strip of tape by cutting through the structure at both ends of the continuous stripe of radioactive salts.

7. The method defined in claim 3 wherein the detection of the underlying position of the strip of tape is accomplished by passinG the finished structure through a circular array of scintillation detectors, recording the beginning and end points of the underlying stripe of radioactive salts on said strip and subsequently indexing the exterior surface of the structure as it moves beyond said detectors by use of said recording of said points to control the indexing means.

* * * * *